United States Patent
Wnuck et al.

(10) Patent No.: US 6,955,042 B1
(45) Date of Patent: Oct. 18, 2005

(54) CPO REGENERATED LEAN NOX TRAP WITH NO MOVING PARTS

(75) Inventors: Wayne G. Wnuck, South Windsor, CT (US); Ke Liu, East Longmeadow, MA (US)

(73) Assignee: HydrogenSource LLC, South Windsor, CT (US)

( * ) Notice: Subject to any disclaimer, the term of this patent is extended or adjusted under 35 U.S.C. 154(b) by 2 days.

(21) Appl. No.: 10/883,069

(22) Filed: Jun. 30, 2004

(51) Int. Cl.[7] ............................................. F01N 3/00
(52) U.S. Cl. ........................ 60/286; 60/287; 60/295; 60/301; 60/311
(58) Field of Search .................... 60/286, 287, 288, 60/295, 300, 301, 311

(56) References Cited

U.S. PATENT DOCUMENTS

| | | | |
|---|---|---|---|
| 5,768,888 A * | 6/1998 | Matros et al. ................ 60/274 |
| 6,708,486 B2 * | 3/2004 | Hirota et al. ................ 60/286 |
| 6,775,973 B2 * | 8/2004 | Liu et al. ...................... 60/301 |
| 6,813,882 B2 * | 11/2004 | Hepburn et al. .............. 60/286 |
| 6,843,054 B2 * | 1/2005 | Taylor et al. ................. 60/275 |
| 6,895,746 B2 * | 5/2005 | Buglass et al. ............... 60/286 |
| 2003/0115857 A1 * | 6/2003 | Preis et al. ................... 60/286 |
| 2003/0226350 A1 * | 12/2003 | Lui ............................. 60/275 |
| 2004/0194449 A1 * | 10/2004 | Schaller et al. .............. 60/285 |
| 2004/0261399 A1 * | 12/2004 | Preis et al. ................... 60/275 |

OTHER PUBLICATIONS

U.S. Appl. No. 10/309,712, filed Dec. 4, 2002.

* cited by examiner

*Primary Examiner*—Thomas Denion
*Assistant Examiner*—Diem Tran
(74) *Attorney, Agent, or Firm*—M. P. Williams

(57) ABSTRACT

A single lean NOx trap (8) has an inlet manifold (10) with baffles (18–20) to divide the inlet manifold into three flow paths (11–13). Each flow path has a thermal reformer (24–26; CPO, (POX, or ATR) with an electric heater provided electric power by related lines (29–31). Fuel from a source (50) is controlled (45–46) to apply pulses of fuel through nozzles (40–42) into each corresponding path (11–13) in turn. A plurality of diesel particulate filters (14) are disposed in the flow paths (11–13) upstream of the lean NOx trap (8). A diesel oxidation catalyst (53) is disposed downstream of the lean NOx trap.

6 Claims, 1 Drawing Sheet

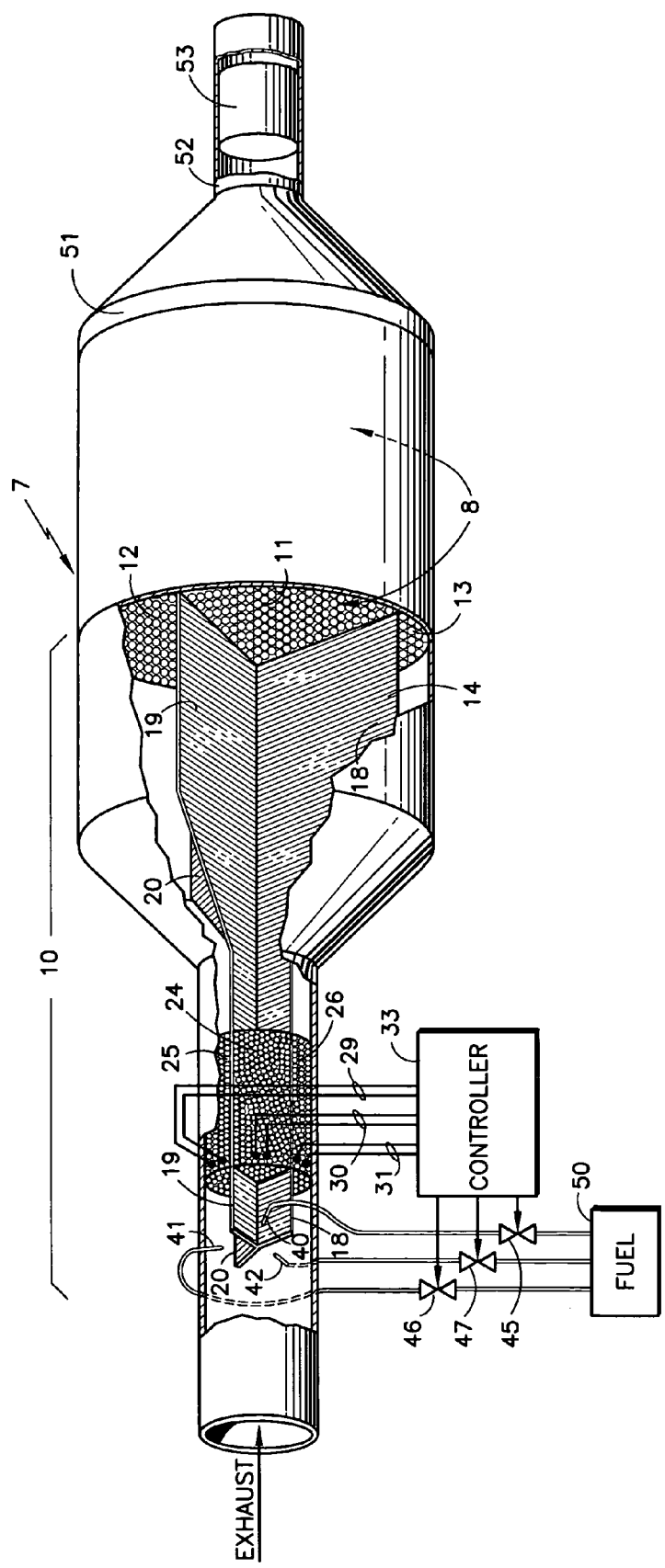

CPO REGENERATED LEAN NOX TRAP WITH NO MOVING PARTS

TECHNICAL FIELD

This invention relates to apparatus for reducing oxides of nitrogen in the exhaust of an internal combustion engine, having a single, catalytic lean NOx trap (LNT) which has an inlet manifold dividing the flow into a plurality of separate flows between separation baffles, each of the separate flows having a thermal reformer, such as a catalytic partial oxidizer (CPO) catalyst, with optional means for heating the upstream end of the CPO catalyst and a nozzle for periodically injecting engine fuel, the CPO catalyst forming a hydrogen containing gas to regenerate the related portion of the LNT catalyst.

BACKGROUND ART

In one type of known system for reducing oxides of nitrogen in the exhaust of internal combustion engines (deNOx), it is known to have a pair of NOx adsorbent traps, such as with a barium carbonate adsorbent, one of which receives exhaust gas while the other receives desorbent (regeneration) gas, typically hydrogen containing reformate from a reformer such as a catalytic partial oxidizer (CPO), a non-catalytic, homogenous partial oxidizer (POx), or an autothermal reformer (ATR). To achieve this, there typically are four high temperature valves, two of which control the flow of exhaust to one of the traps or the other, and two of which control the flow of desorbent gas to the alternative trap.

Heretofore, such high temperature exhaust valves have been unable to operate without leakage. Typically on the order of 5% of the total engine exhaust will flow through the wrong adsorption bed during the adsorption period. Because there may be up to 15% oxygen in the engine exhaust, which oxygen will react with the hydrogen and carbon monoxide in the regeneration gas, a significant amount of regeneration gas is wastefully consumed by being combined with oxygen due to the leaks in the valves, which in turn wastes significant fuel. The reaction of the oxygen with hydrogen and CO of the desorbent gas will cause a rise in temperature which could deactivate the NOx adsorption bed catalyst.

High temperature valves required in controlling the exhaust and regeneration gas of a deNOx system are expensive and bulky.

DISCLOSURE OF INVENTION

Objects of the invention include: eliminating high temperature valves in exhaust deNOx regenerative adsorption beds; improvement in reduction of NOx to nitrogen and other harmless gases in internal combustion engine exhaust; reducing the size and complexity of NOx-reducing equipment for engine exhaust; simplified equipment capable of meeting EPA 2007 NOx emission requirements; and avoiding waste of regeneration gas that occurs due to valve leakage in alternating NOx adsorption systems.

This invention is predicated in part on the realization that injection of fuel into one of several exhaust inlet zones to a single low temperature LNT catalyst creates sufficient back pressure, due to the approximately 16 fold volume expansion of the injected fuel, to divert more exhaust to the others of the zones. As an example, in a three-zone embodiment, the diversion reduces the share of exhaust in each zone from 33%, when none of the zones are in the regeneration mode, to on the order of 25% of the total exhaust, as a result of the increased flow and temperature resulting from conversion of fuel to syngas. The small portion of exhaust provides oxygen, steam (humidity) and heat, that are required for the CPO in that same zone to partially oxidize the diesel exhaust and generate syngas (H2 and CO) for lean NOx trap (LNT) regeneration.

According to the invention, a single LNT catalyst is fed exhaust through a multiple zone inlet manifold, each zone having a small thermal reformer, such as a CPO, a POX or an ATR, and a fuel injection nozzle, whereby to periodically regenerate a portion of the LNT catalyst without any moving parts other than the fuel injecting valves.

According to the invention further, each reformer catalyst may have its own electric heater which a controller will energize only in timed relation with the injection of fuel into the corresponding zone; in accordance with another embodiment of the invention, a single electric heater for all reformers is operated in timed relationship with the injection of fuel into any of the zones; in a third embodiment, a single electric heater for all reformers is left on at all times, whereby to keep the reformers at a light-off temperature for smoother and more reliable operation.

Other objects, features and advantages of the present invention will become more apparent in the light of the following detailed description of exemplary embodiments thereof, as illustrated in the accompanying drawing.

BRIEF DESCRIPTION OF THE DRAWINGS

The sole FIGURE herein is a partially broken away, partially sectioned (with sectioning lines omitted for clarity), perspective view of an embodiment of the invention having separate CPO heaters.

MODE(S) FOR CARRYING OUT THE INVENTION

Referring to the FIGURE, a static LNT deNOx system 7 has a single lean deNOx catalyst 8, such as barium carbonate on cordierite support, having an inlet manifold 10 which is divided into three zones 11–13 by baffles 18–20. Between the baffles 18–20, there are conventional diesel particulate filters 14 (not shown for clarity), which may comprise cordierite or silicon carbide. Each zone has a partial oxidation catalyst 24–26, such as platinum or other noble metal or alloy. At the upstream end of each catalyst 24–26, there is disposed an electric heater element (not shown) which is energized by corresponding sets of wires 29–31 in response to a controller 33.

Each of the zones has a fuel injection nozzle, each connected by a corresponding pipe 40–42 to a corresponding valve 45–47 which supplies fuel from a source 50, such as the on-board primary fuel tank of the internal combustion engine.

The controller 33, may, for example, energize the wires 29 to energize the heater (not shown) within the upstream end of the CPO catalyst 24 in zone 11 just prior to opening the valve 45 so as to provide a pulse of fuel through the nozzle 35 into the zone 11. Or, all three heaters may be energized just before operation of any fuel nozzle; or, a single heater for all three zones may be pulsed or left on continuously during engine operation.

Injection of fuel into the inlet zone 11 will cause exhaust to be diverted to the other two zones 12, 13 to some extent, the remaining exhaust passing through the CPO 24 along with fuel to create syngas, which is typically on the order of 10%–20% hydrogen, 10%–20% CO along with unburned hydrocarbons and other gases, all mixed with exhaust. Since the regeneration of an LNT adsorber, such as barium carbonate, can be accomplished in an extremely small fraction of the time that the exhaust is effectively processed to reduce NOx (on the order of a few percent or more, depending on flow rates), with three zones 11–13, the electric heaters and valve for each zone operating in interleaved fashion, need be operated only about a middling fraction of a total cycle. For instance, the LNT adsorber may effectively adsorb NOx from exhaust for approximately one minute. Each of the zones 11–13 will take a turn of having its heater and valve operated for about 10 seconds. That means a total cycle will require seventy seconds, and there will be periods of about 40 seconds within which exhaust is being adsorbed in the LNT adsorber 8 downstream of all three zones 11–13, interspersed with thirty seconds of regeneration periods.

From the adsorber 8, the low-NOx gas flows through an outlet manifold 51 into an exhaust pipe 52 which will typically contain a diesel oxidation catalyst 53, such as noble metals and alloys. This catalyst will convert non-reacted hydrocarbons, CO, and hydrogen into water and CO2 before being emitted into the ambient atmosphere.

During the initial startup of the associated internal combustion engine, the controller may provide energy to all three electric heaters, and the controller may cause each of the pulses of diesel fuel to be of greater volume during startup than is the case once normal operation has been achieved.

In the configuration shown, the diesel particulate filters 14 are upstream of the deNOx catalyst 8. This configuration causes very effective filtering of the exhaust, and some of the combustion products emanating from the filter actually aids regeneration of the deNOx catalyst 8. On the other hand, the position of the deNOx catalyst 8 and the particulate filters 14 may be reversed, within the purview of the invention. The invention can also be practiced without having the diesel particulate filters formed integrally with the deNOx catalyst 8.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. Apparatus for reducing oxides of nitrogen in the exhaust of an internal combustion engine, comprising:
   an exhaust pipe for containing a stream of engine exhaust;
   at least one lean NOx trap;
   an inlet manifold extending between said exhaust pipe and said at least one lean NOx trap, said inlet manifold having baffles for dividing said inlet manifold into a plurality of flow paths;
   a plurality of thermal reformers, each selected from a CPO, a POX and an ATR, each disposed in one of said flow paths within said inlet manifold;
   a fuel nozzle extending into each of said flow paths for injecting internal combustion engine fuel into the corresponding flow path upstream of the related one of said thermal reformers;
   a source of internal combustion engine fuel; and
   means for selectively causing pulses of fuel from said source to be periodically injected into corresponding ones of said paths repetitively, for periods of time which are a small fraction of the time between pulses in each one of said flow paths.

2. Apparatus according to claim 1 including:
   electric heater means for heating the upstream end of each one of said thermal reformers coincident with the injection of fuel in a path corresponding to each said one thermal reformer.

3. Apparatus according to claim 2 further comprising:
   an electric heater in the upstream end of each of said thermal reformers, and means for applying electric power to each of said heaters in timed relationship to the pulses of fuel injected by said nozzles.

4. Apparatus according to claim 1 further comprising:
   a diesel particulate filter disposed either before or after said lean NOx trap in the stream of exhaust of said exhaust pipe.

5. Apparatus according to claim 1 including:
   a diesel oxidation catalyst disposed downstream from said lean NOx trap in said exhaust stream.

6. Apparatus according to claim 1 wherein:
   said baffles divide said inlet manifold into three or more flow paths.

* * * * *